United States Patent [19]

Meder et al.

[11] Patent Number: 4,519,141
[45] Date of Patent: May 28, 1985

[54] GEAR PROBE

[75] Inventors: Willi Meder, Ettlingen; Hans-Ulrich Bertz, Rastatt; Peter Golder, Ettlingen, all of Fed. Rep. of Germany

[73] Assignee: Willy Höfler, Karlsruhe, Fed. Rep. of Germany

[21] Appl. No.: 419,031

[22] Filed: Sep. 15, 1982

[30] Foreign Application Priority Data

Sep. 15, 1981 [DE] Fed. Rep. of Germany ....... 3136504

[51] Int. Cl.$^3$ .............................................. G01B 7/28
[52] U.S. Cl. ................................ 33/179.5 R; 33/504; 33/551
[58] Field of Search ........................... 33/179.5, 174 P

[56] References Cited

U.S. PATENT DOCUMENTS 4,182,045  1/1980  Bosch et al. ............... 33/179.5 R X
4,322,889  4/1982  Guenter ........................ 33/179.5 R

FOREIGN PATENT DOCUMENTS 2460446  6/1977  Fed. Rep. of Germany .
2067762  7/1981  United Kingdom ........... 33/179.5 R Primary Examiner—Harry N. Haroian
Attorney, Agent, or Firm—Spencer & Frank

[57] ABSTRACT

In a gear probe for testing the shape and orientation of gear flanks, a control and computer unit is used to effect the necessary positioning between the gear flank to be tested and a measuring sensor. First the gear is positioned coarsely; during this step a transmission disc and a linear transmission track are out of engagement with one another. Thereafter, the measuring sensor is advanced into the tooth gap and a fine positioning for a zero balancing of a potentiometer of the measuring sensor is effected by automatically displacing the linear transmission track with respect to the carriage on which it is mounted or by automatically changing the relative angular position between the gear to be tested and the transmission track. All displacements of apparatus components for the coarse and fine positioning as well as for the performance of the measuring process proper are automatically effected by the program-controlled control and computer unit.

3 Claims, 8 Drawing Figures

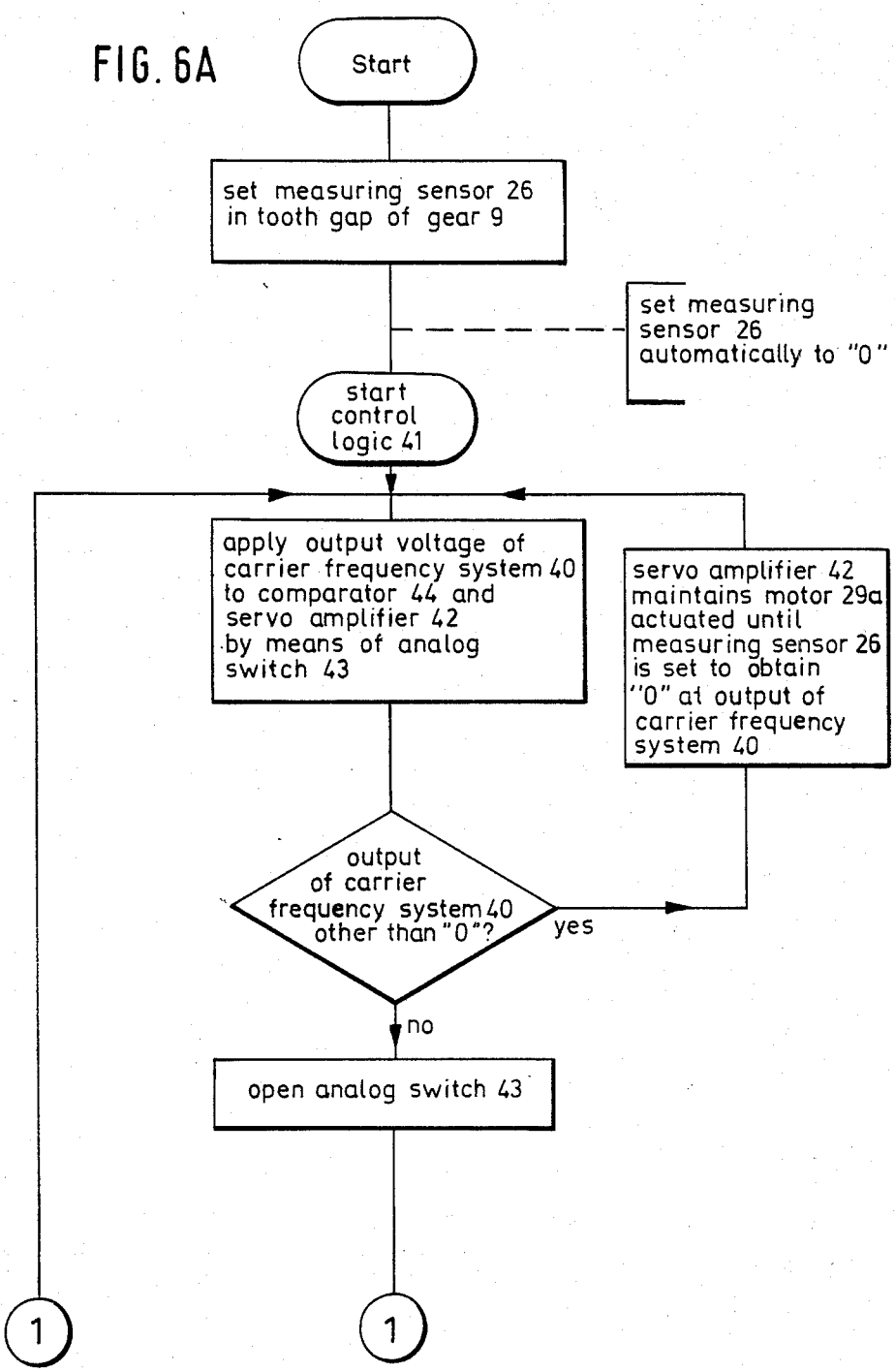

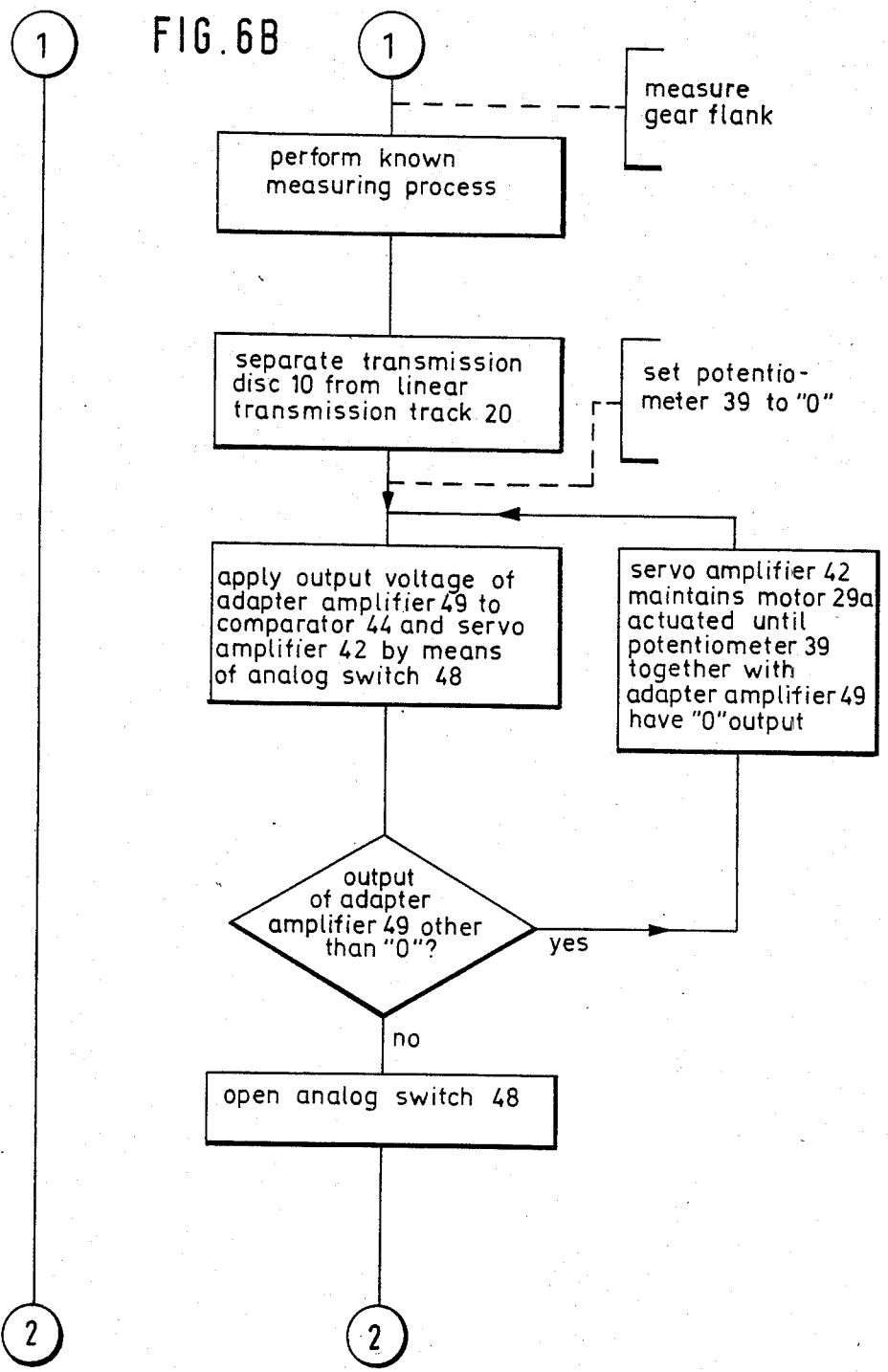

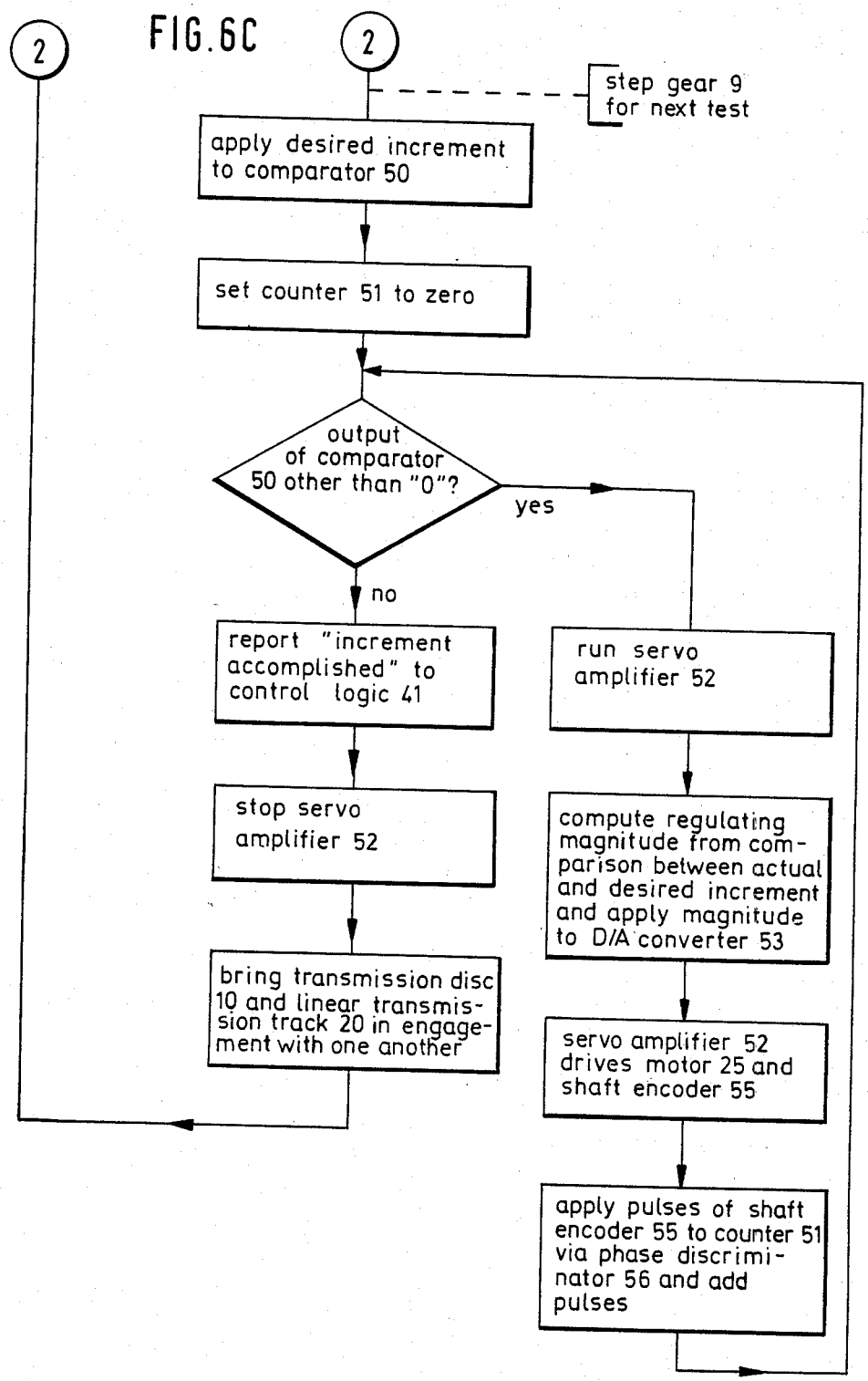

GEAR PROBE

BACKGROUND OF THE INVENTION

This invention relates to a gear probe, more particularly to an apparatus for testing the flank shape (involute) and flank direction (tooth orientation) of straight or helical involute gears. The apparatus has a first carriage displaceable by means of a motorized spindle drive on a stationary guide way in a direction perpendicular to the axis of the gear to be tested. On the first carriage there is mounted a linear guide way which may be angularly adjustable in a plane which is parallel to the gear axis. The gear probe further has a second carriage which is displaceable by means of a motorized spindle drive in a guide way which is parallel to the gear axis and which may be coupled to the first carriage or to the stationary guide way. On the second carriage there is mounted a measuring sensor which is set to the base circle diameter of the gear to be tested. The second carriage, by means of a sliding block, engages into the linear guide way mounted on the first carriage. The gear probe further has a third carriage which, by means of a connection with the first carriage, is movable in a direction perpendicular to the axis of the gear to be tested. On the third carriage there is mounted a linear transmission track engageable by the periphery of a transmission disc supported in axial alignment with the gear. For the purpose of mutual positioning of the gear and the measuring sensor, the linear transmission track is longitudinally displaceable with respect to the third carriage by means of a threaded spindle. Further, the transmission disc may be disengaged from the linear transmission track by a motorized drive which moves the transmission disc away from the linear transmission track.

An apparatus of the above-outlined type is disclosed in German Auslegeschrift (Application Published After Examination) No. 2,460,446. As described therein, the coupler between the first and third carriages comprises a U-shaped lever which, with its web connecting the legs of the lever, is pivotally supported on the apparatus frame. By virtue of such an arrangement it is not necessary to use a separate transmission disc which fits precisely the different base circle diameters of the gears to be tested, but it is sufficient to have transmission discs available which correspond merely to the order of magnitude of the given base circle diameter; the fine adjustment to the precise base circle diameter in each instance is obtained by changing the effective length of one of the legs of the U-shaped lever.

It is noted at this point, however, that the present invention is not limited to the particular structure of a gear probe as outlined above. Rather, the present invention may find application in other conventional gear probes of the type outlined above, wherein for each gear a transmission disc is used which corresponds precisely to the base circle diameter of the gear tested and wherein the first and third carriages are connected directly (that is, relatively unadjustably) with one another.

For testing the flank shape or the flank orientation by the gear probe disclosed in the above-identified German Auslegeschrift, it is first required to position the gear flank with respect to the measuring sensor. This is achieved by disconnecting the transmission disc from the linear transmission track and the gear to be probed is so rotated manually that it is coarsely pre-positioned for a measuring step. Thereafter, the transmission disc is brought into engagement with the linear transmission track by moving the carriage on which the transmission disc and the gear support are mounted, in the direction of the linear transmission track by a motor drive which may be push-button-operated. Then, by rotating the setting spindle of the first carriage by a motor drive and thus simultaneously causing displacement of the third carriage (on which the linear transmission track is mounted) transversely to the axis of the gear to be probed, the measuring sensor is brought next to the gear flank to be tested. Because of an only coarse previous positioning of the gear, however, the measuring sensor arrives in such a deflected position onto the gear flank that the inductive transmitter coupled with the measuring sensor and emitting measuring signals is not balanced to the zero value or even to an approximately zero value. Stated differently, the measuring sensor is in such a deflected position that for the measuring process which follows, a full scale which is of equal extent on either side of the zero position is not available. Rather, the measuring range is shifted in one direction so that in that direction only a relatively small measuring range is available as compared to the opposite direction. Thus, in order to counteract a very substantial deviation of the measuring sensor from the zero position, the transmission disc is again disconnected from the linear transmission track and the coarse position of the gear to be probed is corrected manually by appropriate rotation. If, after the first coarse positioning or after a successive coarse positioning the deviation of the measuring sensor from the zero position is only relatively slight, the linear transmission track is, with respect to its carriage (that is, the third carriage) and thus simultaneously with respect to the first carriage manually displaced by actuating a setting spindle connected therewith. Such a displacement is continued until an indicator provided for this purpose shows that the zero positioning of the measuring sensor and thus the zero equalization of the inductive transmitter connected therewith is at least approximately reached. Thereafter, by actuating the setting spindle drive coupled with the first or the second carriage the measuring process pertaining to the gear flank shape or the gear flank orientation may be carried out and the sensed measuring values typed out by a printer device.

As a rule, these measurements performed on a gear are taken for several gear flanks distributed along the circumference of the gear. Thus, for example, measurements are performed at three gear flanks in which case the gear, after each measurement, has to be stepped by approximately 120°. Such stepping, in turn, is performed by manually rotating the gear after having disconnected the transmission disc from the linear transmission track, whereupon the above-described process involving a likely coarse positioning and fine positioning has to be repeated.

The above-outlined method is expensive and time-consuming particularly because of the continuously needed manual operations: since the measuring process proper is performed relatively rapidly and thus the manual adjustments take a very substantial share of the entire measuring time for the individual gears, the gear probe can be utilized for the measuring process proper only during a relatively small portion of the entire measuring time required for the gear.

SUMMARY OF THE INVENTION

It is an object of the invention to provide an improved apparatus of the above-outlined type which automatically performs the entire measuring process, including the heretofore manually effected stepping of the gear to present a new gear flank to the measuring sensor, as well as the coarse and fine adjustments, so that operating personnel need only to insert the gear to be examined and remove the same upon completion of the tests. The invention makes possible that every operating person may be assigned a greater number of gear probes than heretofore and further, each gear probe is utilized in an optimum manner. It is a further object of the invention to effect such optimization by simple complementation of the known apparatus.

These objects and others to become apparent as the specification progresses, are accomplished by the invention, according to which, briefly stated, in a preferred embodiment the linear transmission track is displaceable with respect to the third carriage by means of a motor drive automatically controlled by a control and computer unit. When the linear transmission track and the transmission disc are out of engagement with one another, the transmission disc, together with the gear to be tested, is angularly adjusted (stepped) by a motor and shaft encoder unit through a predetermined angle as controlled by the control and computer unit to present a gear flank to the measuring sensor. For the fine positioning of the gear flank with respect to the measuring sensor, the control and computer unit first angularly adjusts the gear and thereafter reestablishes engagement between the transmission disc and the linear transmission track. Thereupon, by automatic energization of the motor drive of the first carriage, the measuring sensor—while the guidance of the second carriage is coupled to the first carriage—is brought at least in the vicinity of the gear flank to be tested and thereafter in this position, by displacing the linear transmission track with respect to the third carriage, at least approximately a zero balancing of the inductive signal transmitter of the measuring sensor is effected. Upon obtaining the zero balancing, the measuring process proper is effected by an automatic actuation of the drive of the first or second carriages. According to another preferred embodiment, embodiment, the torque connection between the transmission disc and the gear is disengageable and a motor drive is provided for effecting a relative rotation of these components with respect to one another.

As a result of the measures provided according to the invention, namely, the motor-driven displacement of all machine components which participate in the preparation and performance of the measuring process and the control of their motions by means of the control and computer unit, the entire measuring process, including the positioning of the gear flank to be measured with respect to the measuring sensor may be effected automatically in the required sequence. Thus, the operating person only has to insert the gear to be tested into the gear probe and, upon completion of the measurements, to replace it with the next gear and therefore the operating personnel may handle a significantly greater number of gear probes.

It is conceivable that a gear to be tested is inserted into the apparatus in such an orientation that after a first automatic stepping by means of the motor and shaft encoder unit, the measuring sensor, upon movement into the gear teeth, abuts against the top land of a tooth or otherwise assumes such a remote position from the required precise position that for a fine adjustment a greater displacement is necessary than what can be achieved, for example, by the linear transmission track. For such a case, within the meaning of "coarse positioning", the measuring sensor is, by an automatically controlled step, brought once more out of contact with the gear to be tested and the latter, after disengagement of the frictional contact between the transmission disc and the linear transmission track, is submitted to an additional coarse positioning by causing it to perform a settable incremental step before the measuring sensor is again moved into the gear teeth and an attempt is made for a fine positioning.

The measures according to the invention have the advantage that the motor and shaft encoder unit for the coarse positioning of the gear to be tested has a relatively simple and inexpensive structure since the number of incremental steps needs to be only relatively small which, as known, determines, to a great measure, the costs of the motor and shaft encoder unit.

As noted before, it is customary to perform the gear flank measurements at several flanks distributed uniformly about the circumference of the gear, in order to also detect any wobble errors in the gear. For this purpose, according to the invention, after performing the respective measuring process or processes at one gear flank, the control and computer unit disengages the transmission disc and the linear transmission track from one another and the gear is stepped by the motor and shaft encoder unit by a predetermined number of teeth for the consecutive positioning and measuring process. This step-like advance may be set in a simple manner in the control and computer unit since the number of teeth of the gear and the number of desired measurements distributed along the circumference of the gear are known in advance.

BRIEF DESCRIPTION OF THE DRAWING

FIGS. 6a, 6b and 6c show a programming flow diagram pertaining to the control and computer unit shown in FIG. 5.

DESCRIPTION OF THE PREFERRED EMBODIMENTS

Figure 1:
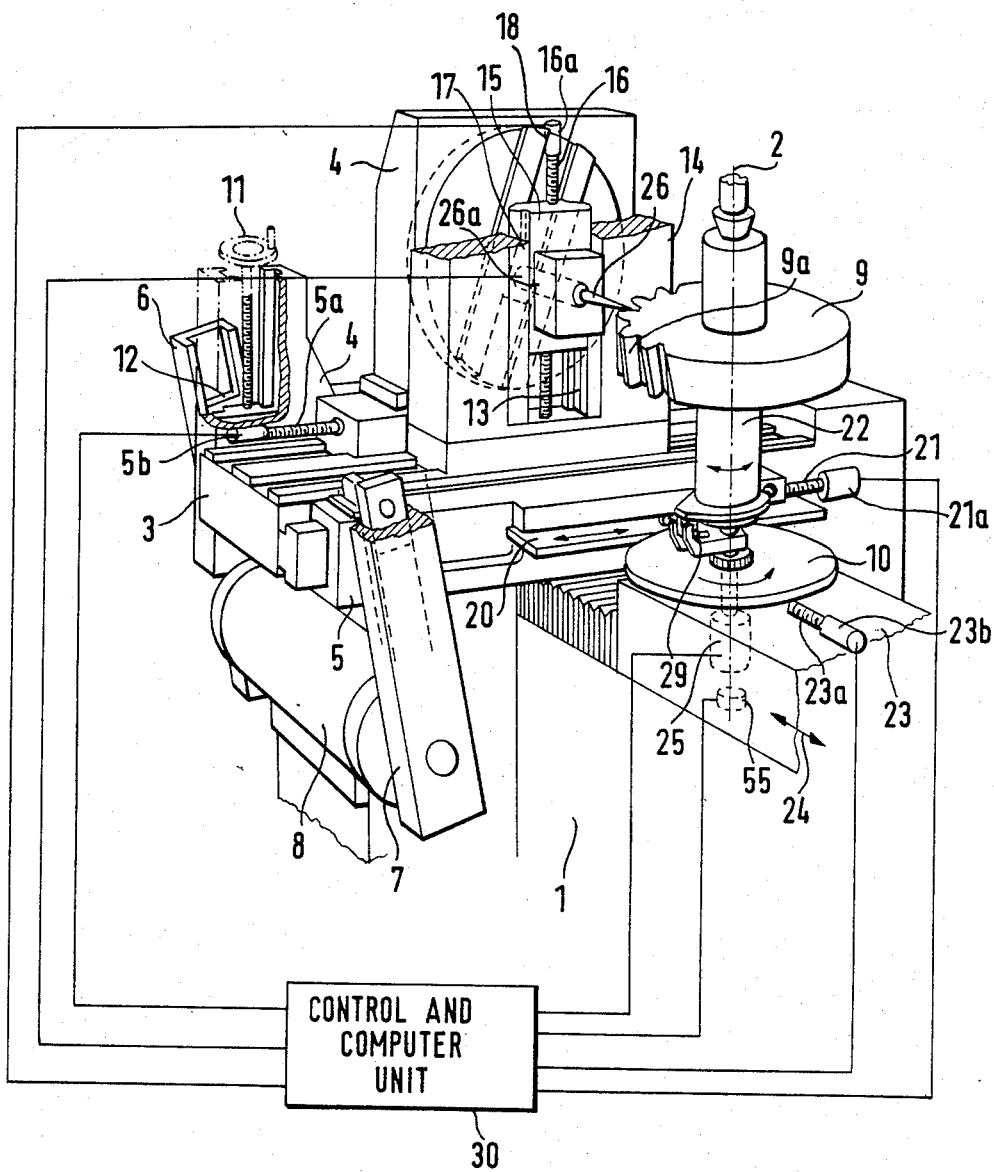
FIGS. 1 and 2 are schematic perspective views of three preferred embodiments of the invention.

Turning now to FIG. 1, the probe illustrated therein comprises a stand 1 on which there is mounted a horizontal stationary guide way 3 extending transversely to the axis 2 of a gear support shaft 22 on which a gear 9 to be tested is coaxially mounted. A carriage 4 is movable on the guide way 3 perpendicularly to the axis 2 by means of a spindle 5a driven by a motor 5b. The motion of the carriage 4 is transmitted to a carriage 5 by means of a U-shaped lever having legs 6 and 7. The U-shaped lever has a web 8 at which the lever is pivotally supported on the machine frame 1 and which joins the two lever legs 6 and 7 with one another. The apparatus includes a transmission disc 10 which is mounted in alignment with the axis 2 and the diameter of which is selected to be at the order of magnitude of the base circle of the gear 9 to be tested. In order to provide for a fine setting of the transmission disc 10 to the exact base circle diameter of the gear 9, the relative motion between the carriage 4 and the carriage 5 is changed by means of changing the length of the lever 6 by turning a hand wheel 11 which moves a slide 12 in the length dimension of the lever 6. The slide 12 is in operative engagement with the lever 6.

A support block 14 is displaceable on the guide way 3 together with the carriage 4. The block 14 is either coupled to the first carriage 4 or is immobilized on the guide way 3, dependent upon whether the one or the other of the two below-discussed measuring processes are to be performed. In the block 14 there is arranged a guide way 13 which extends parallel to the axis 2. The coupling of the support block 14 to the carriage 4 on the one hand or the guide way 3 on the other hand may be effected by known mechanisms not discussed in further detail.

A carriage 15 is mounted in the support block 14 for displacement in the guide way 13 parallel to the axis 2. The carriage 15 is displaceable by a spindle 16 driven by a motor 16a. The carriage 15 engages, by means of a slide block 17, a linear guide way 18 supported on the carriage 4. 2The guide way 18 is, dependent upon the oblique orientation of the teeth 9a of the gear 9, angularly adjustable with the aid of optical adjusting means or the like and may be immobilized on the carriage 4. The spindle 5a of the carriage 4 and the spindle 16 of the carriage 15 are connected to their respective carriages by means of a clutch mechanism for establishing or interrupting a driving connection between the spindle and its carriage. The clutch mechanism for each spindle essentially comprises a split nut arranged to threadedly engage or be disengaged from its associated spindle. If the two nut halves are driven apart, the nut will become disengaged from its spindle so that a rotation of the spindle by its associated motor will not result in any motion of the associated carriage. On the contrary, if the nut halves are brought together, they threadedly engage the respective spindle so that a rotation of the spindle will cause travel of the nut thereon and, the nut being force-transmittingly mounted in the respective carriage, a displacement of the carriage will occur. Conventionally, the operator, when making the initial setting of the angular position of the guide way 18 will make the necessary clutch settings for that measurement. Thus, if, for example, the guide way 18 is to be set to a large acute angle with respect to the vertical (as viewed, for example, in FIG. 1), a motion of the carriage 15 in its guide way 13 by the spindle 16 would be blocked by the guide way 18. Therefore, for such a setting, the operator will disengage the above-described half-nut clutch mechanism for the spindle 16 and at the same time engage the half-nut clutch mechanism for the spindle 5a, so that any displacement of the carriage 15 (and thus any displacement of the measuring sensor 26) will be caused by the spindle drive 5a, 5b, associated with the carriage 4. Such a clutch mechanism is, by itself, conventional and therefore not described or illustrated in further detail.

On the carriage 5 there is mounted a linear transmission track 20 which may be adjustable relative to the carriage 5 by means of a spindle 21 driven by a motor 21a. The linear transmission track 20 is, during the measuring process proper, in a frictional engagement with the periphery of the transmission disc 10.

A carriage 23 on which the transmission disc 10 and the gear support shaft 22 are mounted is movable in the direction of the double-headed arrow 24 towards and away from the linear transmission track 20 whereby frictional engagement between the transmission disc 10 and the linear transmission track 20 may be established or interrupted. The carriage 23 is movable by a spindle 23a driven by a motor 23b.

The transmission disc 10 and thus the gear support shaft 22 as well as the gear 9 are, when the transmission disc 10 and the linear transmission track 20 are disconnected from one another, rotatably adjusted by a motor and shaft encoder unit 25, 55 in order to coarsely position the gear 9 for the measuring process to be performed thereon. The unit 25,55 is formed of a motor 25 torque-transmittingly coupled to the gear support shaft 22 and a shaft encoder 55 operatively coupled to the motor 25 for monitoring and controlling the angle through which the shaft 22 is stepped (rotated) by the motor 25.

Once the proper positioning of a measuring sensor 26—supported on the carriage 15—relative to a flank of a tooth 9a is obtained, the two measuring processes considered here are conventionally performed in the following manner:

For testing the flank shape (involute) the block 14 is coupled with the carriage 4 and the latter is in operative connection with the spindle drive 5a. Upon actuation of the motor 5b of the spindle 5a the measuring sensor 26 moves horizontally and, simultaneously, by means of the connection of the carriage 4 with the carriage 5 with the intermediary of the U-shaped lever and by means of the engagement of the linear transmission track 20 with the transmission disc 10, the gear 9, corresponding to the involute to be tested, rolls on the measuring edge of the sensor 26. The measuring edge is set to the base circle diameter of the gear 9.

In case the orientation, that is, the oblique positioning of the gear flank is to be examined, the support block 14 is coupled to the stationary guide way 3 and the carriage 4 is disconnected from the spindle drive 5a. As a result, the measuring sensor 26 is moved vertically by the motor 16a along the guide way 13 which, by means of the slide 17, causes corresponding displacements of the carriage 4 and, by means of the U-shaped lever, causes a corresponding displacement of the carriage 5. Consequently, the measuring sensor 26 travels along the oblique gear tooth. The displacements of the carriage 4 and the carriage 5 are effected with the intermediary of the linear guide way 18 corresponding to the oblique positioning of the tooth flank 9a.

In order to bring the measuring sensor 26 in such a position with respect to the gear flank 9a that an optimal utilization of the measuring value range of the measuring sensor is possible, it is necessary to move the measuring sensor 26 into engagement with the gear flank 9a in such a manner that an inductive transmitter 26a of the measuring sensor 26 is at least approximately balanced to zero at the beginning of the measuring process.

In order to achieve the desired purpose set forth in the preceding paragraph, the gear 9 is first preliminarily and coarsely positioned by the motor and shaft encoder unit 25, 55 while the transmission disc 10 and the linear transmission track 20 are disconnected from one another and thereafter a driving connection between the transmission disc 10 and the linear transmission track 20 is reestablished by displacing the carriage 23 towards the carriage 5 by means of the motor 23b. Thereupon the measuring sensor 26 which is first situated externally of the gear 9, is moved horizontally into the aligned tooth gap while the carriage 4 is coupled to the support block 14 and operatively connected to the spindle drive 5a, 5b. As the measuring sensor 26 engages the gear flank to be tested or assumes a position in the vicinity of the gear flank, then, because of the only coarse positioning of the gear 9 performed previously, the measuring sensor 26, as a rule, is not yet in a position where the above-noted desired zero balancing is achieved. For this purpose, by means of the motor 21a the linear transmission track 20 is automatically displaced with respect to the carriage 5 until the measuring sensor 26 reaches a position in which its inductive transmitter is balanced approximately to the zero value. Thereafter, the above-described known measuring processes may be performed. The direction of the above-noted fine positioning for the zero balancing of the measuring sensor is automatically obtained inasmuch as the positive or negative sign of the position of the measuring sensor is given and thereby the proper direction of correction for the fine positioning is also predetermined.

If, upon moving the measuring sensor 26 into the tooth gap where testing is intended, a fine positioning is outside the adjustment range of the linear transmission track 20 with respect to the carriage 5, in an automatic operation the measuring sensor 26 is again moved outwardly and after disconnecting the linear transmission track 20 from the transmission disc 10 the carriage 23 is moved away from the carriage 5 by the motor 23b and the gear 9, by actuation of the motor and shaft encoder unit 25, 55, is stepped coarsely in the direction which is necessary to achieve a better approximation of the necessary measuring sensor position with respect to the flank to be probed.

The above-described coarse and fine positioning between the measuring sensor 26 and the flank of the gear 9 and the measuring processes proper are performed automatically by a control and computer unit 30 connected with the motors 5b, 16a, 21a, 23b and 25 as well as with the shaft encoder 55 and the inductive transmitter 26a of the measuring sensor 26. The inductive transmitter 26a serves as an actual value transmitter. The operation of the control and computer unit 30 as well as principal components thereof will be described in more detail as the specification progresses. The control and computer unit 30 performs a comparison between the desired values and the actual values and then the necessary correcting measures are carried out as described above.

For probing the gear 9 it is, as a rule, required to test a plurality of circumferentially uniformly distributed gear flanks. For this purpose the control and computer unit 30 is preprogrammed according to the known number of gear teeth and the desired number of measuring processes such that after performing the first measuring process, the connection between the linear transmission track 20 and the transmission disc 10 is disconnected and the gear 9 is stepped through an angle necessary to bring the gear into position for the next flank to be tested. Thereafter, the coarse and fine positioning is performed in the manner described above.

Figure 2:
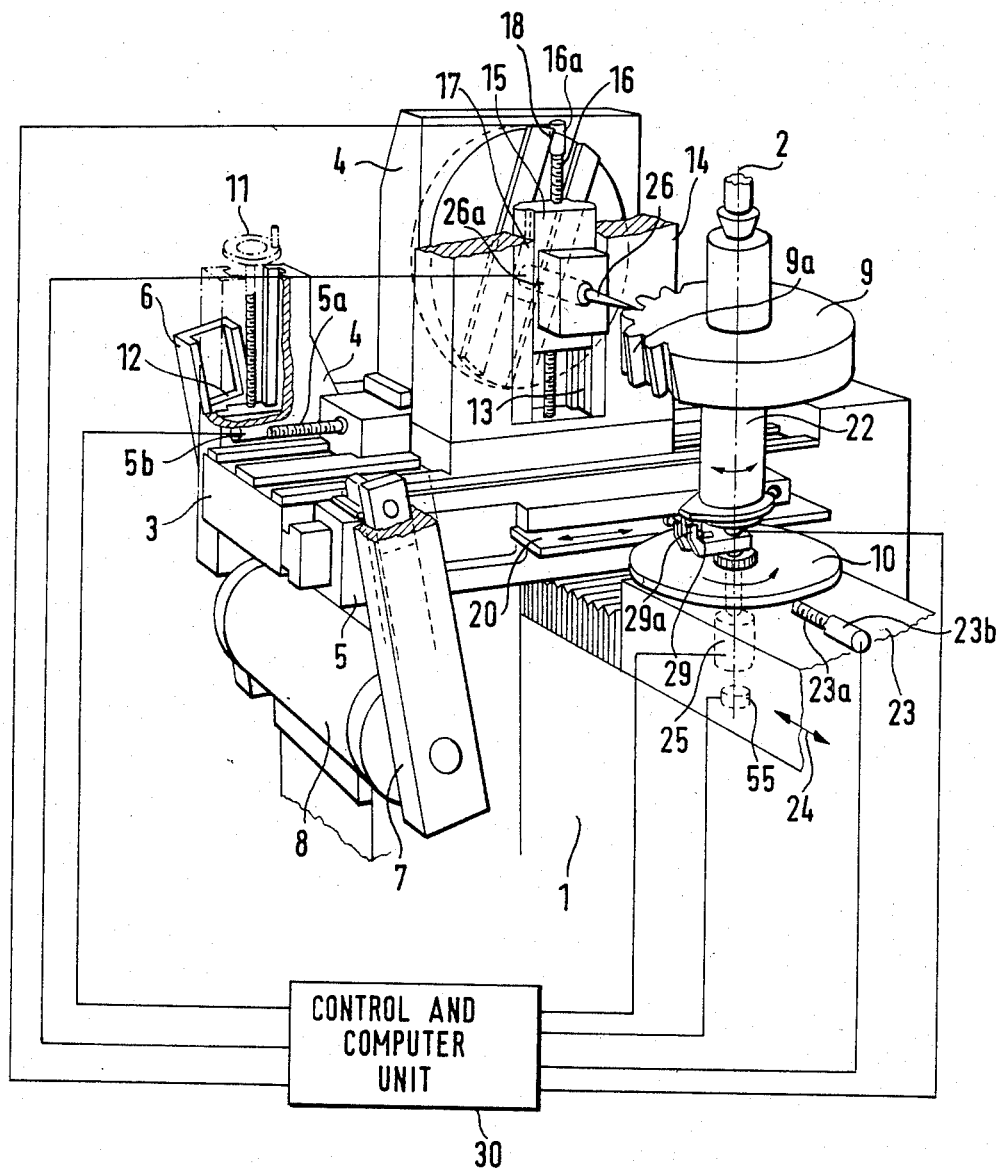
Figure 3:
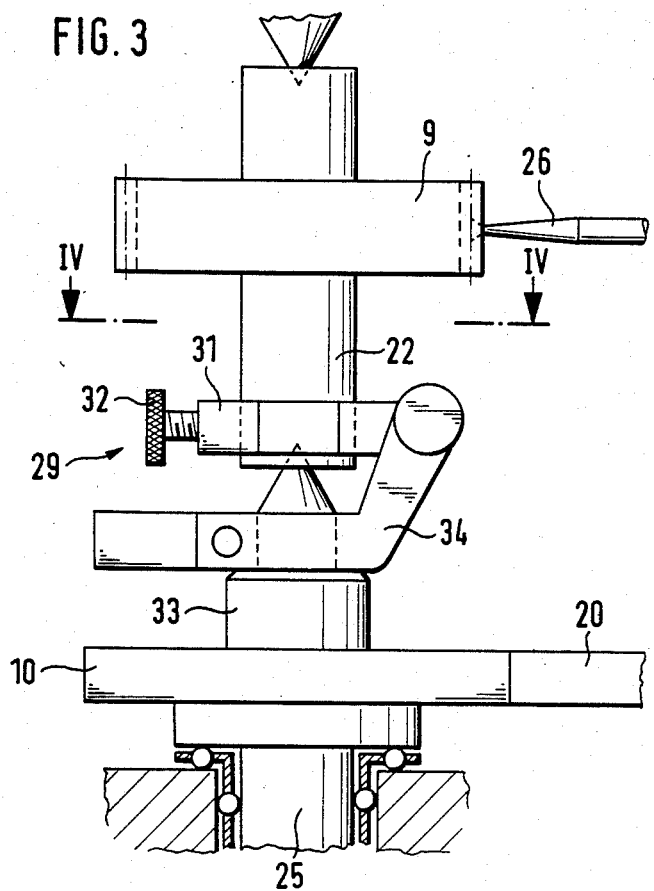
FIG. 3 is a schematic side elevational view of a detail of one of the preferred embodiments.
Figure 4:
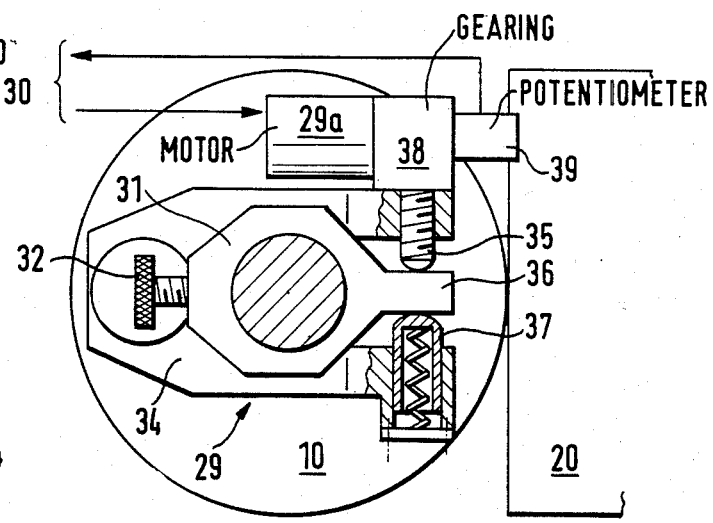
FIG. 4 is a partially sectional, broken-away view, taken along line IV—IV of FIG. 3.

According to the described preferred embodiment a fine positioning of the measuring sensor 26 with respect to the gear flank is feasible because the linear transmission track 20 is movable with respect to the carriage 5 by means of the spindle drive motor 21a. Turning now to FIG. 2, the same result can also be achieved by providing that the coupling between the transmission disc 10 and the gear support shaft 22 is releasable and these two components are rotatable with respect to one another by means of a coupling 29 actuated by a motor 29a for achieving a fine positioning. The motor 29a is, for an automatic control, coupled to the control and computer unit 30, as shown in FIG. 2. Details of the coupling 29 which effects a relative rotation between the gear 9 and the transmission disc 10 are illustrated in FIGS. 3 and 4. For normal operation, a rigid torque-transmitting function is performed by the coupling 29 between the motor 25 and the gear support shaft 22. Thus, when the motor 25 of the motor and shaft encoder unit 25, 55 is energized, the transmission disc 10 and the gear 9 rotate as a unit. To the gear support shaft 22 there is affixed a lug ring 31 by means of a tightening screw 32. On a stub shaft 33 of the motor 25 there is affixed the transmission disc 10 as well as torque-applying member 34. The latter includes a movable pin 35 which is in engagement with one side of a lug 36 of the lug ring 31. The torque-applying member 34 further carries a spring-loaded counter support 37 which engages the other side of the lug 36 and urges it against the movable pin 35. Thus, torque-transmission from the motor 25 to the gear 9 occurs by virtue of the engagement of the lug 36 with the pin 35 and the counter support 37. The movable pin 35 is connected, with the intermediary of a gearing 38, with the motor 29a. Thus, if angular shift of the gear 9 with respect to the transmission disc 10 is required, the motor 29a is energized on command by the control and computer unit 30, whereby the pin 35 is advanced or retracted to a certain degree thereby changing the angular position of the lug ring 31 with respect to the torque-applying member 34. This then means that the same angular shift has occurred between the gear 9 secured to the gear support shaft 22 and the transmission disc 10 secured to the stub shaft 33. With the gearing 38 there is connected a potentiometer 39 which is moved by the motor 29a to the extent of the setting magnitude. In this manner the control and computer unit 30 knows how large the displacement was so that it can again find the zero or mid position. Such a resetting may be performed after each individual measuring process or may be effected after the entire gear has been tested. It is noted that such a potentiometer is, for the same purpose, also associated with the motor 21a driving the linear transmission track 20 of the first embodiment (FIG. 1).

The above-described embodiments according to the invention provide the possibility that the operating person needs only to insert the gear 9 to be tested into the apparatus, whereupon the processes for the coarse and fine positioning of the gear flank with respect to the measuring sensor 26 are automatically performed by the control and computer unit 30. When a balancing of the measuring sensor 26 with respect to the gear flank 9a is, by the positioning processes, achieved to such an extent that the measuring sensor is at least approximately set to zero, command for commencing the programmed measuring processes is given by the computer.

It will be understood that the relative displacement (for example, that of the linear transmission track 20) effected for the fine positioning in connection with one gear is automatically cancelled before a new gear is tested in order to ensure that a sufficient range of displacement for the component to be shifted (for example, the linear transmission track 20) is available as the new probing process starts.

Figure 5:
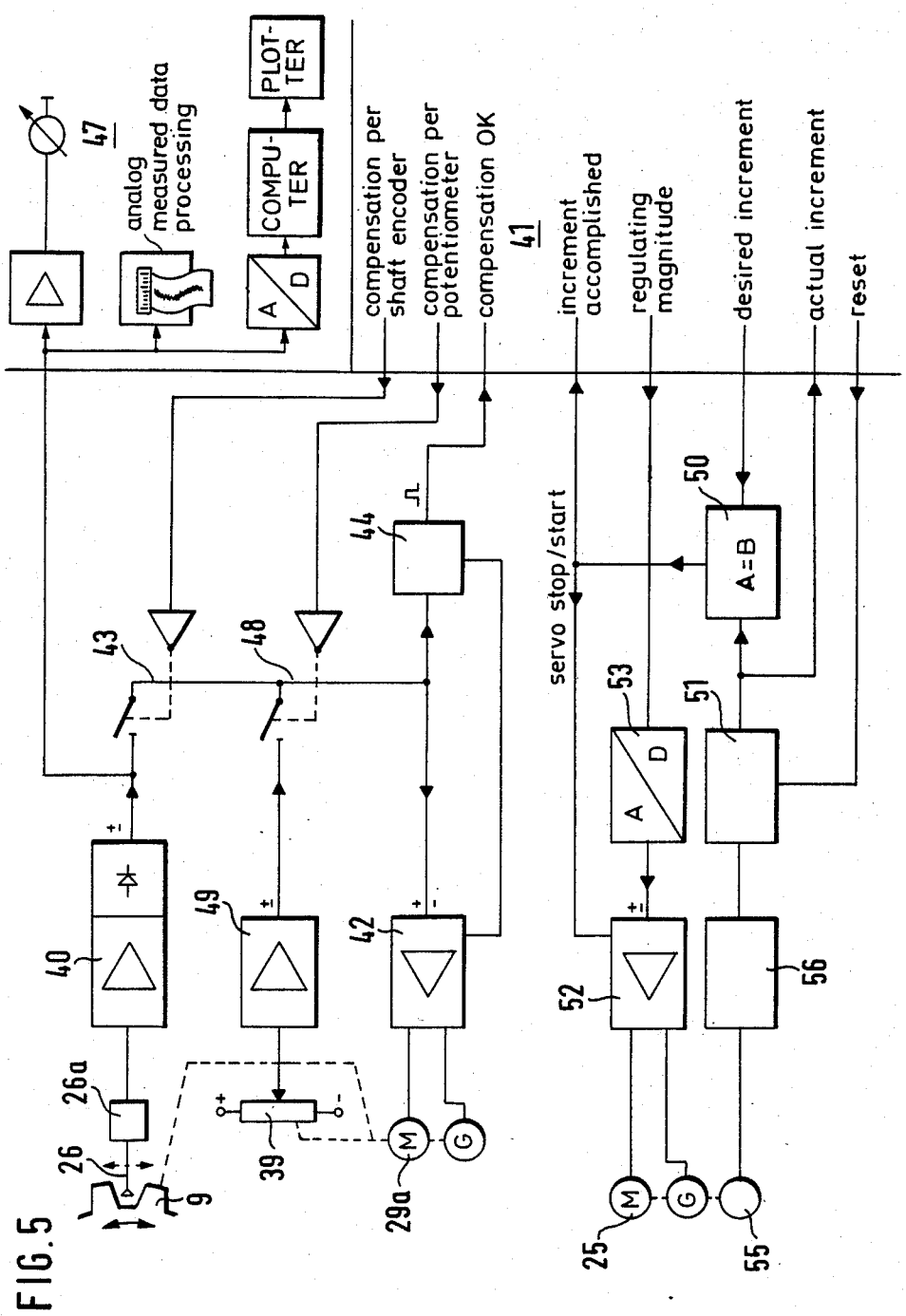
FIG. 5 is a block diagram of a control and computer unit incorporated in the invention.

The principle of operation of the control and computer unit 30 will now be described in connection with the embodiment illustrated in FIGS. 2, 3 and 4 and with reference to FIG. 5 showing the unit 30 in block diagram.

As the first step in the automatic operation of the gear probe according to the invention, the measuring sensor 26 is brought manually or automatically into a tooth gap of the gear 9, for performing measurements on a tooth flank bounding the gear gap. To the input of a carrier frequency system 40 there is applied a signal for the inductive signal transmitter 26a of the measuring sensor 26 as a function of the position of the measuring sensor 26. Based on this signal, the carrier frequency system 40 generates a DC output signal which thus represents the position of the measuring sensor 26 in the tooth gap.

A control logic 41 applies the output from the carrier frequency system 40 to the input of a servo amplifier 42 by means of an analog switch 43. At the same time, the output voltage of the carrier frequency system 40 is applied to a zero comparator 44. In case the voltage is other than zero, the zero comparator 44 maintains the servo amplifier 42 energized as long as the motor 29a has balanced the gear 9 to the sensor position "zero". During this step, the potentiometer 39 is also shifted by the motor 29a. Such a balancing of the gear 9 causes the output at the carrier frequency system 40 to be reduced to zero volt. Upon reaching the zero volt value, the zero comparator 44 shuts off the servo amplifier 42 and, at the same time, applies a pulse to the control logic 41, commanding the latter to open the analog switch 43.

The measuring process proper is performed from the root of the tooth to the top land thereof. The measuring signals are applied by the carrier frequency system 40 to an evaluating computer and/or visual recording device 47.

The transmission disc 10 is separated from the linear transmission track 20.

Through an analog switch 48 the control logic 41 applies the voltage taken from the potentiometer 39 to the input of the servo amplifier 42 with the intermediary of an adapter amplifier 49. At the same time, this voltage is applied to the zero comparator 44. If the voltage is other than zero, the zero comparator 44 energizes the servo amplifier 42 as long as the motor 29a has brought the potentiometer 39 to a zero voltage output value. This results in a zero voltage output for the adapter amplifier 49. As a result, the zero comparator 44 shuts off the servo amplifier 42 and, at the same time, applies a pulse to the control logic 41, commanding the latter to open the analog switch 48.

For stepping the gear 9 to the subsequent gear flank to be tested, the control and computer unit 30 operates as follows:

The incremental step whose magnitude was computed by the control logic 41 is applied to a comparator 50. An actual value counter 41 is set to zero. As a result, the comparator 50 no longer senses A=B and thus a servo amplifier 52 is actuated. From a comparison between desired increment and actual increment, the control logic 41 computes a regulating magnitude which is applied to a D/A converter 53. This analog regulating magnitude thus controls the motor 25 of the motor and shaft encoder unit 25, 55 by the servo amplifier 52. The pulses generated by the shaft encoder 55 are applied by a phase discriminator 56 to the actual value counter 51.

When the actual increment equals the desired increment, the comparator 50 shuts off the servo amplifier 52 and reports "increment accomplished" to the control logic 41.

As a result of the above-described steps, a new tooth gap is aligned with the measuring sensor 26.

Thereafter, the transmission disc 10 and the linear transmission track 20 are brought into engagement with one another, that is, the measuring sensor 26 is advanced into the new tooth gap and the above-described automatic adjusting and measuring cycle is repeated.

A programming flow diagram for the control and computer unit 30 is shown in sequential FIGS. 6a, 6b and 6c.

It will be understood that the above description of the present invention is susceptible to various modifications, changes and adaptations, and the same are intended to be comprehended within the meaning and range of equivalents of the appended claims.

What is claimed is:

1. A gear probe for testing the shape and orientation of tooth flanks of a gear supported in the probe, comprising in combination:
   (a) a probe frame;
   (b) a first guide way supported on said probe frame;
   (c) a first carriage supported on said first guide way for displacement parallel to a first direction;
   (d) a first motor means connected to said first carriage for displacing said first carriage parallel to said first direction;
   (e) a second guide way supported on said first carriage angularly adjustably in a plane parallel to said first direction;
   (f) a third guide way oriented in a second direction;
   (g) a second carriage supported in said third guide way for displacement in said second direction and being slidably connected with said second guide way;
   (h) a second motor means connected to said second carriage for displacing said second carriage parallel to said second direction;
   (i) a measuring sensor mounted on said second carriage;
   (j) a third carriage supported on said first guide way for displacement parallel to said first direction;
   (k) means for coupling said first carriage to said third carriage for transmitting displacement forces from said first carriage to said third carriage;
   (l) a linear transmission track shiftably supported on said third carriage for a linear displacement with respect to said third carriage parallel to said first direction;
   (m) a third motor means connected to said linear transmission track for displacing said linear transmission track with respect to said third carriage linearly and parallel to said first direction;
   (n) a fourth carriage supported on said probe frame for displacement parallel to a third direction;
   (o) a gear support mounted on said fourth carriage and having a rotary axis extending transversely to said first direction and parallel to said second direction and said plane; said gear support being arranged for supporting a gear to be tested, in an axial alignment with said rotary axis;
   (p) a transmission disc mounted on said gear support in axial alignment with said rotary axis;

(q) a motor and shaft encoder unit connected to said gear support for rotating in unison said transmission disc and the gear to be tested;

(r) a fourth motor means connected to said fourth carriage for displacing said fourth carriage transversely towards and away from said third carriage for bringing said transmission disc in force-transmitting frictional engagement with or, respectively, moving said transmission disc away from said linear transmission track; and (s) a control and computer means connected to said motor and shaft encoder unit and said first, second, third, and fourth motor means for automatically acutating said motor and shaft encoder unit for a coarse positioning of the gear flank to be tested with respect to said measuring sensor, further for automatically actuating said fourth motor means to establish frictional engagement between said transmission disc and said linear transmission track, further for automatically actuating said first motor means for displacing said first and second carriages to move said measuring sensor at least approximately in the vicinity of the gear flank to be tested, further for automatically actuating said third motor means for displacing said linear transmission track linearly in said first direction with respect to said third carriage for a fine positioning of the gear flank to be tested with respect to said measuring sensor and further for a selective automatic actuation of said first or second motor means for performing a measuring process by moving said measuring sensor on the gear flank to be tested.

2. A gear probe for testing the shape and orientation of tooth flanks of a gear supported in the probe, comprising in combination:

(a) a probe frame;

(b) a first guide way supported on said probe frame;

(c) a first carriage supported on said first guide way for displacement parallel to a first direction;

(d) a first motor means connected to said first carriage for displacing said first carriage parallel to said first direction;

(e) a second guide way supported on said first carriage angularly adjustably in a plane parallel to said first direction;

(f) a third guide way oriented in a second direction;

(g) a second carriage supported in said third guide way for displacement in said second direction and being slidably connected with said second guide way;

(h) a second motor means connected to said second carriage for displacing said second carriage parallel to said second direction;

(i) a measuring sensor mounted on said second carriage;

(j) a third carriage supported on said first guide way for displacement parallel to said first direction;

(k) means for coupling said first carriage to said third carriage for transmitting displacement forces from said first carriage to said third carriage;

(l) a linear transmission track supported on said third carriage;

(m) a fourth carriage supported on said probe frame for displacement parallel to a third direction;

(n) a gear support mounted on said fourth carriage and having a rotary axis extending transversely to said first direction and parallel to said second direction and said plane; said gear support comprising axially aligned first and second shafts; said first shaft being arranged for supporting a gear to be tested, in an axial alignment with said rotary axis;

(o) a transmission disc mounted on said second shaft in axial alignment with said rotary axis;

(p) coupling means connecting said first and second shafts to one another;

(q) a third motor means connected to said coupling means for exerting, by said coupling means, a torque to least one of said first and second shafts for rotating said first and second shafts with respect to one another to effect relative rotation between said transmission disc and said gear to be tested about said rotary axis;

(r) a motor and shaft encoder unit connected to said gear support for rotating in unison said transmission disc and the gear to be tested;

(s) a fourth motor means connected to said fourth carriage for displacing said fourth carriage transversely towards and away from said third carriage for bringing said transmission disc in force-transmitting frictional engagement with or, respectively, moving said transmission disc away from said linear transmission track; and (t) a control and computer means connected to said motor and shaft encoder unit and said first, second, third, and fourth motor means for automatically actuating said motor and shaft encoder unit for a coarse positioning of the gear flank to be tested with respect to said measuring sensor, further for automatically actuating said fourth motor means to establish frictional engagement between said transmission disc and said linear transmission track, further for automatically actuating said first motor means for displacing said first and second carriages to move said measuring sensor at least approximately in the vicinity of the gear flank to be tested, further for automatically actuating said third motor means for rotating said second shaft supporting said transmission disc with respect to said first shaft supporting said gear to be tested for a fine positioning of the gear flank to be tested with respect to said measuring sensor and further for a selective automatic actuation of said first or second motor means for performing a measuring process by moving said measuring sensor on the gear flank to be tested.

3. A gear probe as defined in claim 1 or 2, wherein said control and computer unit comprises means for applying a signal to said fourth motor means for effecting disengagement of said transmission disc from said linear transmission track subsequent to the completion of a measuring process and further comprises means for applying a signal to said motor and shaft encoder unit for stepping said gear support, together with the gear mounted thereon, through a predetermined increment for presenting to said measuring sensor a new gear flank to be tested.

* * * * *